United States Patent [19]

Puhr-Westerheide

[11] 4,083,760
[45] Apr. 11, 1978

[54] ELECTROLYTIC PRECISION DRILLING DEVICE AND PROCESS

[75] Inventor: Jörg Puhr-Westerheide, Birkenau, Germany

[73] Assignee: MTU Motoren-und Turbinen-Union Munchen GmbH, Munich, Germany

[21] Appl. No.: 718,429

[22] Filed: Aug. 27, 1976

[30] Foreign Application Priority Data

Aug. 30, 1975 Germany .............................. 2538653

[51] Int. Cl.² .......................... C25F 3/02; C25D 17/12
[52] U.S. Cl. ............................ 204/129.55; 204/224 M; 204/225
[58] Field of Search ............. 204/129.1, 129.55, 129.6, 204/224 M, 225

[56] References Cited

U.S. PATENT DOCUMENTS

| 3,801,489 | 4/1974 | Samson | 204/224 M |
| 3,886,059 | 5/1975 | Mikulski | 204/224 M |

Primary Examiner—John H. Mack
Assistant Examiner—D. R. Valentine
Attorney, Agent, or Firm—Haseltine, Lake & Waters

[57] ABSTRACT

A device and process of electrolytic precision drilling of a plurality of in-line boreholes formed in a row, the boreholes having skewed axes and serving as cooling air holes in a workpiece includes a plurality of tubular electrodes for passing a stream of electrolyte therethrough, the stream being directed at the workpiece, an electrolyte manifold head, the tubular electrodes being attached thereto, guidance means which have an upper edge and are provided with coaxial guidance bores for each of the bores to be formed in the workpiece for receiving the tubular electrodes respectively, and where the guidance means are rigid with the workpiece, and feed means for the tubular electrodes. The electrodes are dimensioned for a guidance-free length to remain between the attachment point of the tubular electrodes of the electrolyte manifold when the electrodes reach a final bore depth in the workpiece; that length is at least equal to fifty times the diameter of one of the tubular electrodes. The manifold head includes holding means for the tubular electrodes and the holding means includes an elastic material which has a modulus of elasticity not exceeding 500 kp/mm²; the electrolyte manifold head has a direction of feed which coincides with a line bisecting the axes of the outermost boreholes of the row.

5 Claims, 2 Drawing Figures

ELECTROLYTIC PRECISION DRILLING DEVICE AND PROCESS

BACKGROUND OF THE INVENTION

1. Field of the Invention

This invention relates to an electrolytic precision drilling method for incorporating a plurality of in-line holes having skewed (anti-parallel) axes and, more particularly, this invention relates to a method for incorporating cooling air holes in the trailing edge of a three-dimsionally twisted turbine blade by means of tubular electrodes through which a stream of electrolyte is directed on to the workpiece comprising an electrolyte manifold head to which all tubular electrodes are attached, and a guidance part disposed rigid with the workpiece, and provided with a coaxial bore to be formed in the blade, and including a feeding device for the tubular electrodes.

2. Description of the Prior Art

At the combustion gas temperatures encountered in modern applications the leading and trailing edges of turbine nozzle vanes and rotor blades need intensive cooling with air. This is achieved by blowing cooling air through a number of fine holes normally arranged in rows. These holes are formed using various known electrolytic precision drilling processes (also see CH-PS No. 457,798 or DT-OS No. 2,135,207). These known methods, however, permit of incorporating only a small number of holes (maximally some five to seven) at one pass because of the twist of the turbine blades, and of the resulting skewed axes of the holes. In the present state of the art of the practice is to relocate and rotate the workpiece or especially the turbine blade, after forming a number of holes in the proper location in a subsequent pass. The main disadvantage inherent in this method is that in the manufacture of turbine blades, which require from about 50 to 70 cooling air holes, the machining time and consequently all resulting negative or disadvantageous consequences of a manufacturing process are unduly extended.

In U.S. Pat. No. 3,803,015 there is disclosed a device for electrolytic precision drilling of a plurality of non-parallel bores, having a plurality of tubular electrodes attached to a single electrolyte manifold head, the latter being pushed upon drilling through a rigid guidance portion, a guidance bore being provided for each respective tubular electrode upon drilling. It is a main disadvantage of this known device or the method therefor, that the tubular electrodes are subjected to a considerable bending stress, due to the fact that they are also subjected to a double bending occurring during each bending process, the latter including an intermediate bending point, since the electrodes are forcibly guided in the guidance means. It is a further disadvantage of these forcible guidance means that increased friction results between the tubular electrodes and the walls of these forcible guidance means. Finally, the bending angle of these tubular electrodes is particularly large, since they are firmly gripped in the electrolyte manifold head, thus preventing any independent bending movement, the manifold head constituting the feeding means.

SUMMARY OF THE INVENTION

In a broad aspect the present invention provides an improvement over the electrolytic precision drilling method of the cited generic category by considerably cutting the machining time especially when forming a large number of holes while requiring a minimum of tools and fixtures, so that savings in machining time are not cancelled by the use of expensive devices.

The tubular electrodes should, in particular, be subjected to as little stress as possible during the process, so that the highly sensitive capillary tubes do not fracture upon the drilling process.

It is a particular object of the present invention to provide a process of the cited generic category which is characterized by the following features: the length of the tubular electrodes) $(n_1-n_x)$ is so large, that a guidance-free length remains between the attachment location of the tubular electrodes on the electrolyte manifold head and the upper edge of the guidance device, amounting to at least 50 times the outer diameter of a tubular electrode upon reaching the full bore or drilling depth. The tubular electrodes $(n_1 - n_x)$ are held in the electrolyte distributor head in an elastic material having a modulus of elasticity not exceeding 500 kp/mm$^2$, such as, for example, a two-component epoxy cement.

Not only is a very small total bending of the tubular electrodes per se obtained by the combination of these features, in view of the elastically bendable attachment of the tubular electrodes to the electrolyte manifold head and the special feeding means of the latter, but at the same time any wear and therefore any weakening of the tubular electrodes by friction on the guide walls is avoided by the guidance-free intermediate space formed between the guidance portion and the electrolyte manifold head in which the total bending of the tubular electrode occurs in dependence of the feed.

An enormous shortening of the process time is therefor possible by the device, according to the present invention, by relatively simple means, since a very large number of boreholes (about 60) can be simultaneously bored. Due to the elastic holding means of the tubular electrodes on the electrolyte manifold head it is possible to achieve a relatively large total bending of the individual tubular electrodes, since these are not stressed as, for example, a rigidly clamped rod, but are permitted to change their respective directions at their point of origin.

In a further aspect of the present invention the tubular electrodes are aligned at the electrolyte manifold head in a zero or unstressed neutral position such that the electrodes will be unbent when the electrolyte manifold head reaches a position corresponding to one-half the depth to be drilled. This provision automatically halves the bending stress on each tubular electrode and so makes for correspondingly larger allowable total angles of twist from the first to the last hole of a row.

In a further aspect of the present invention the tubular electrodes used are glass capillaries, the ratio of outer to inner diameter of which is less than 1.5. Such tubular electrodes will safely bend through angles of about plus minus 10°, which will be sufficient for precision drilling whenever the total angle of twist, as indicated above, will not exceed an order of 3° to 10°.

In a still further aspect of the present invention use is made of glass capillaries the overall length of which is at least 100 times their outer diameter, which makes for sufficient length of guidance in the guide member, ensures the minimum distance between the electrolyte manifold head and the guide member and which, moreover, adequately allows for the tolerances encountered in the length of the hole proper.

BRIEF DESCRIPTION OF THE DRAWING

Further aspects and advantages of the present invention will become apparent from the following detailed description read in light of the accompanying drawings, in which.

DESCRIPTION OF THE PREFERRED EMBODIMENTS

Figures 1, 2:
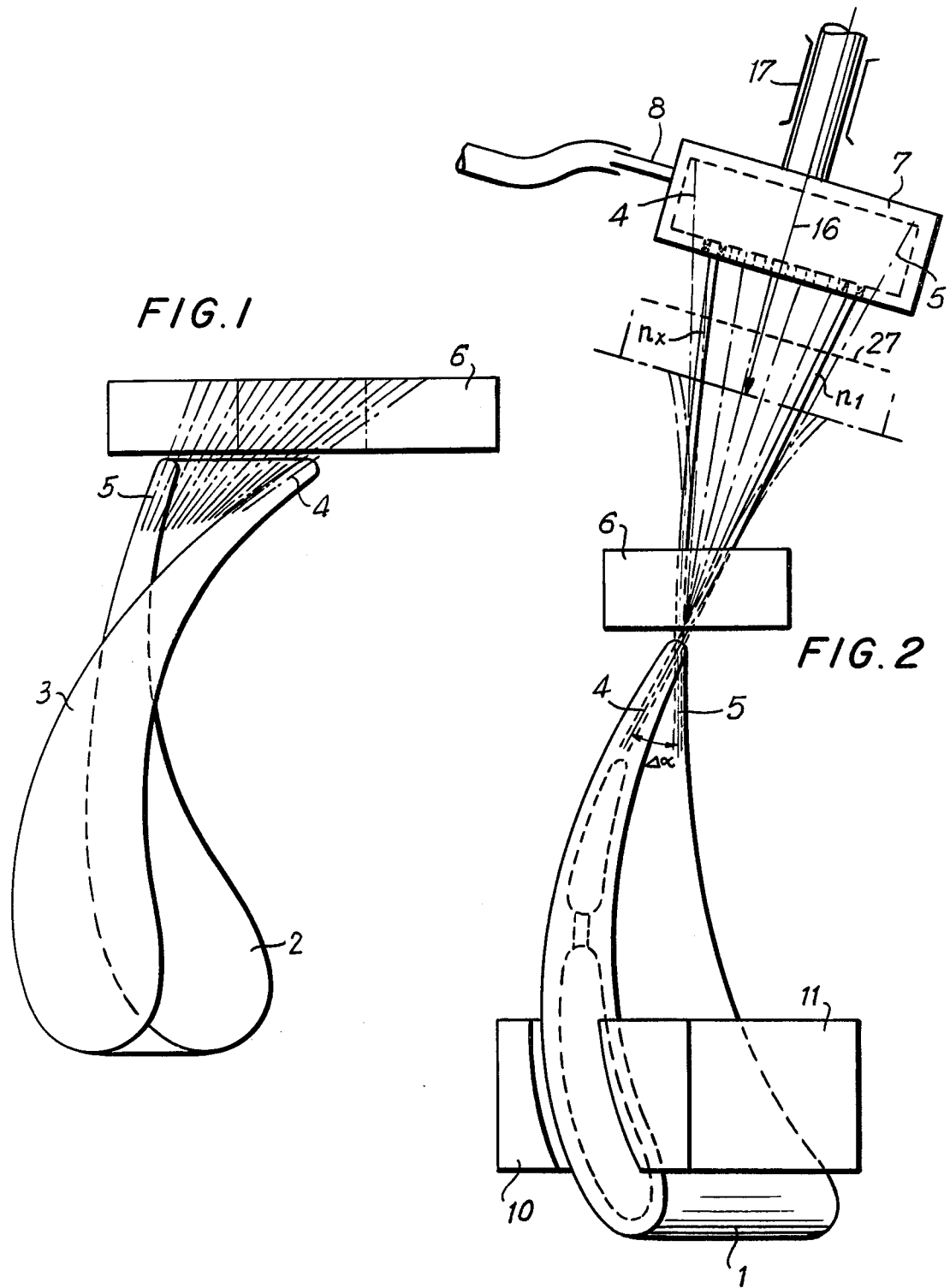
FIG. 1 is a plan view and illustrates a twisted axial-flow turbine blade shown enlarged in a centripetal direction.
FIG. 2 is an overall arrangement illustrating the implementation of the precision drilling method of the present invention, and showing for clarity of representation an oblique view of the trubine blade where the trailing edge extends at right angles to the plane of projection.

With reference now to FIG. 1 a highly twisted axial-flow turbine blade is indicated by the numeral 1. The base surface 2 and the top surface 3 of the turbine blade 1 are rotated relative to one another such that in the centripetal view of FIG. 1 the trailing edges of the blade will not overlap. A dash-dotted line 4 indicates the direction of the hole axis in the area of top surface 3 of the blade's trailing edge, and a dash-dotted line 5 indicates the direction of hole in the blade's trailing edge in the area of base surface 2. The direction of the bore varies over the entire height of trailing edge from direction 4 to direction 5, where 60 additional holes are placed approximately between the uppermost hole of the entire row having the direction 4, and the lowermost hole of the entire row having the direction 5. Arranged immediately above the trailing edge of the blade is a guide member 6 formed for each hole of the row with a coaxially arranged guide hole for the respective tubular electrode.

With reference to FIG. 2 the turbine blade 1 is held in jaws 10 and 11 and shown in oblique view from above such that the trailing edge of the blade extends at right angles to the plane of projection. This shows the total angle of twist $\Delta\alpha$ from direction 4 of the topmost hole to direction 5 of the lowermost hole in true size.

Arranged above the guide member 6 is an electrolyte manifold head 7. It has a manifold chamber to which there are connected an electrolyte supply line 8, and the entirety of of tubular electrodes $n_l$ to $n_x$. The electrolyte manifold head 7 is slideably supported by a bearing shown here schematically, where the direction of feed (arrowhead 16) coincides with the bisecting line between the direction of borehole 4 and the direction of borehold 5. The tubular electrodes $n_l$ to $n_x$ are glass capillaries, each of which is held at the electrolyte manifold head 7 in an elastic material, such as a two-component epoxy cement having a modulus of elasticity not exceeding 500 kp/mm$^2$. Embedded in such a two-component epoxy cement the glass capillaries admit of some amount of deflection at their respective roots on the electrolyte manifold head 7. The glass capillaries $n_l$ to $n_x$ are aligned in such a manner that in their zero position, i.e., in the absence of any external load, they will assume the direction required for the final direction or boreholes to be formed in blade 1. In the arrangement shown in FIG. 1 the direction of glass capillaries $n_l$ on the electrolyte manifold head 7 coincides with the direction of the borehole 4, whereas the direction of the glass capillaries $n_x$ runs parallel to the direction of the borehole 5.

The position of electrolyte manifold head 7 shown here is that assumed at the beginning of the drilling process, when the tubular electrodes $n_l$ to $n_x$ extend into the guide member 6, but do not project below the lower edge of this guide member 6. The other extreme position of the electrolyte manifold head 7 is shown in dash-dotted line. This is the position when the drilling process has been completed and the tubular electrodes have reached the full drilling depth. (Broken lines in the area of turbine blade 1 along axes of boreholes 4 and 5). The extreme position is selected so that the minimum distance between the lower edge of electrolyte manifold head 7 and the upper edge of guide member 6 is still 50 times the outer diameter of glass capillaries $n_l$ to $n_x$. The illustration of the first electrode $n_l$ and the last electrode $n_x$ of the entire row of electrodes, which two electrodes are subjected to the greatest bending load during the drilling process, shows that the elastic mounting of the tubular electrodes on the electrolyte manifold head 7, and the particular alignment of the zero position according to the axes of boreholes 4 and 5 result in no more than moderate deflection of the tubular electrodes, which take the shape of glass capillaries. It will readily become apparent that when electrolyte manifold head 7 is in a position exactly corresponding to one-half of the feed motion of the tubular electrodes, as indicated by the broken line 27, the bending and deflection of the outermost tubular electrodes $n_l$ and $n_x$ are zero.

What we claim is:

1. A device for electrolytic precision drilling of a plurality of in-line boreholes formed in a row, the boreholes having skewed axes and serving as cooling air holes in a workpiece, comprising:

a plurality of tubular electrodes for passing a stream of electrolyte therethrough, said stream being directed at the workpiece;

an electrolyte manifold head, said tubular electrodes being attached therto;

guidance means having an upper edge and being provided with coaxial guidance bores corresponding to each of the boreholes to be formed in the workpiece for slidably receiving said tubular electrodes, respectively, said guidance means being adapted to be rigid with the workpiece; and feed means for said tubular electrodes, said feed means being attached to said manifold head, said electrodes being dimensioned for a guidance-free length remaining between the attachment point of said tubular electrodes on said electrolyte manifold and the upper edge of said guidance means upon the electrodes reaching a final bore depth in the workpiece, said length being at least equal to 50 times the diameter of one of said tubular electrodes;

said manifold head including holding means for said tubular electrodes, and being arranged above said guidance means, said holding means comprising elastic material having a modulus of elasticity not exceeding 500 kp/mm$^2$, said electrolyte manifold head having a direction of feed coinciding with a line bisecting the axes of the outermost boreholes of the row, said electrodes being positioned on said manifold head in relation to said guidance means and the bores therein such that with the manifold head moved one-half of its total feed motion, the outermost electrodes, have zero bending and deflection.

2. The electrolytic precision drilling device according to claim 1 wherein the workpiece is the trailing edge of a spatially twisted turbine blade, and said material is a two-component epoxy cement.

3. A method for electrolytic precision drilling of a plurality of in-line boreholes formed in a row, the boreholes having skewed axes and serving as cooling air holes in a workpiece, the holes being drilled by a plurality of tubular electrodes attached to a movable manifold head, comprising the steps of:

holding the tubular electrodes in the manifold head by elastic material having a modulus of elasticity not exceeding 500 kp/mm$^2$;

receiving the tubular electrodes in guidance means, the manifold head being arranged above the guidance means, the latter having an upper edge and being provided with guidance bores coaxial with respective boreholes to be formed in the workpiece, the guidance means being rigid with the workpiece, the tubular electrodes being slidably received in the coaxial guidance bores;

feeding the electrolyte manifold head in a direction of feed coinciding with a line bisecting the axes of the outermost boreholes of the row;

feeding the tubular electrodes into the workpiece to form said boreholes, the electrodes being dimensioned so that upon reaching a final bore depth in the workpiece a guidance-free length remains between the attachment point of the tubular electrodes on the electrolyte manifold and the upper edge of the guidance means, the length being at least 50 times the diameter of one of the tubular electrodes;

passing a stream of electrolyte through the plurality of tubular electrodes;

directing the stream at the workpiece; and aligning the tubular electrodes in the manifold head in relation to the guidance bores such that no bending of the tubular electrodes will occur in a position corresponding to one-half of the final bore depth.

4. A method according to claim 3 wherein the tubular electrodes are glass capillaries having an outer to inner diameter ratio of less than 1.5.

5. A method according to claim 4 wherein the overall length of the glass capillaries is at least 100 times the outer diameter of each of the capillaries.

* * * * *